United States Patent Office 3,088,950
Patented May 7, 1963

3,088,950
21-FLUORO 2-ALKYL PREGNENE COMPOUNDS
Howard J. Ringold and George Rosenkranz, Mexico City, Mexico, assignors, by mesne assignments, to Syntex Corporation, a corporation of Panama
No Drawing. Filed Aug. 13, 1957, Ser. No. 677,852
Claims priority, application Mexico Aug. 21, 1956
3 Claims. (Cl. 260—397.3)

The present invention relates to cyclopentanophenanthrene compounds and to a process for the production thereof.

More particularly the present invention relates to novel 21-fluoro-2-alkyl and 2-aralkyl derivatives and especially to 21-fluoro-2-alkyl and 2-aralkyl derivatives of $\Delta^4$-pregnen-3,20-dione which may be substituted with an $\alpha$-hydroxyl group at position C–17 and which may also be substituted with an oxygen function ($\beta$-hydroxyl or ketone) at position C–11 and to a process for the production of these compounds.

The novel hormones of the present invention having a 17$\alpha$-hydroxy group as for example 21-fluoro-2$\alpha$-alkyl or aralkyl-$\Delta^4$-pregnen-17$\alpha$-ol-3,11,20-trione and 21-fluoro-2$\alpha$-alkyl or aralkyl-$\Delta^4$-pregnen-11$\beta$,17$\alpha$-diol-3,20-dione are cortical type hormones having anti-inflammatory properties. Compounds of this type cause glycogen deposition in rats. On the other hand, those 2$\alpha$-methyl-21-fluoropregnene derivatives of the present invention without a hydroxyl group at C–17 are inhibitors of the uterus growth as shown by essays in mice and therefore are anti-estrogenic compounds.

In our U.S. application Serial No. 632,014, filed January 2, 1957, now abandoned, there is disclosed the production of 2-alkyl and 2-aralkyl derivatives of $\Delta^4$-pregnene-17$\alpha$,21-diol-3,11,20-trione and of $\Delta^4$-pregnene-11$\beta$,17$\alpha$,21-triol-3,20-dione. By a method precisely similar to that disclosed in the aforementioned application except starting with compounds without the 11$\beta$-hydroxy group or the 11-keto group and without the 17$\alpha$-hydroxy group there may also be prepared similar 2-alkyl and 2-aralkyl derivatives of 2$\alpha$-alkyl or aralkyl-$\Delta^4$-pregnene-21-ol-3,20-dione (2$\alpha$-alkyl or aralkyl desoxycorticosterone), 2$\alpha$-alkyl or aralkyl-$\Delta^4$-pregnene-17$\alpha$,21-diol-3,20-dione (2$\alpha$-alkyl or aralkyl Reichstein's Substance S), 2$\alpha$-alkyl or aralkyl-$\Delta^4$-pregnene-11$\beta$,21-diol-3,20-dione (2$\alpha$-alkyl or aralkyl corticosterone), 2$\alpha$-alkyl or aralkyl-$\Delta^4$-pregnene-21-ol-3,11,20-trione (2$\alpha$-alkyl or aralkyl-11-dehydrocorticosterone), etc.

In accordance with the present invention it has been discovered that 2$\alpha$-alkyl or aralkyl pregnene compounds of the character just described upon treatment with methane sulfonyl chloride in pyridine gave the corresponding 21-methane sulfonate which when reacted with sodium iodide gave the corresponding 21-iodo compound. This last intermediate upon reaction with silver fluoride in acetonitrile gave the desired final products namely the 21-fluoro-2-alkyl or aralkyl derivatives of $\Delta^4$-pregnene-3,20-dione. The novel compounds of the present invention may therefore be exemplified by the following formula:

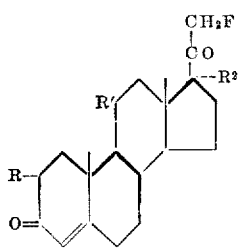

In the above formula R represents an alkyl group preferably a lower alkyl group such as methyl, ethyl or propyl or R may represent an aralkyl group such as benzyl. R' represents a hydroxy group in $\beta$ configuration or R' represents a keto group or R' represents hydrogen. $R^2$ represents a hydroxy group in $\alpha$ configuration or $R^2$ represents hydrogen. The novel compounds of the present invention may be prepared by a process exemplified by the following equation:

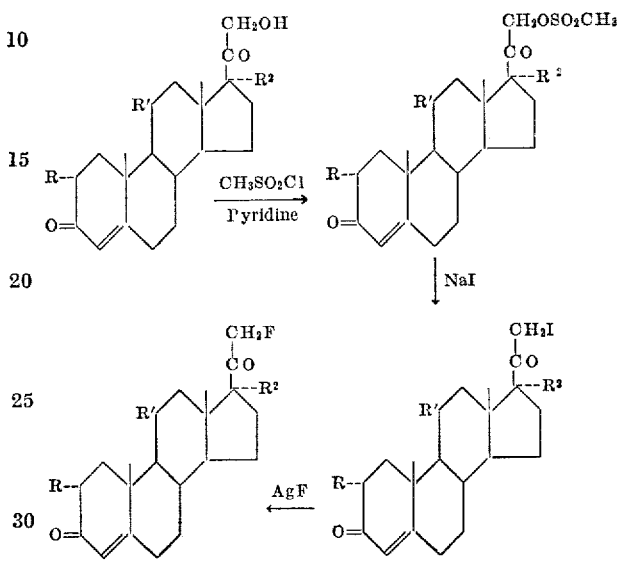

In the above equation R, R' and $R^2$ represent the same groups as heretofore set forth.

In practicing the process of the present invention the 2-alkyl or 2-aralkyl derivative of a $\Delta^4$-pregnene-3,20-dione is dissolved in a mixture of an organic solvent and pyridine. An especially suitable mixture is chloroform-pyridine. The solution is then cooled to below room temperature as for example 0° C. and methane sulfonyl chloride is added thereto in portions. The reaction mixture is then kept at a temperature below room temperature for a period of time of the order of 14 hours. The crude methane sulfonate of the 2-alkyl or aralkyl-$\Delta^4$-pregnene-3,20-dione derivative, obtained from the reaction mixture by evaporation to dryness, was then dissolved in organic solvent such as acetone and mixed preferably at room temperature (20° C.) with sodium iodide. The precipitate formed after pouring the reaction mixture into water was the corresponding 2$\alpha$-alkyl or aralkyl-21-iodo-$\Delta^4$-pregnene-3,20-dione derivative. The product was collected by filtration, dried in a vacuum and then dissolved in acetonitrile. Thereafter a solution of silver fluoride in water was slowly added thereto. After a short time silver iodide started to separate leaving in solution the desired 21-fluoro-2$\alpha$-alkyl or aralkyl-$\Delta^4$-pregnene-3, 20-dione derivative. The reaction mixture was then allowed to stand at room temperature for about one day and then filtered. The desired 21-fluoro-2$\alpha$-alkyl or aralkyl-$\Delta^4$-pregnene-3,20-dione derivative was then obtained from the solution by concentration and crystallization and purified as by recrystallization from an organic solvent such as methyl-acetate.

The following specific examples serve to illustrate but are not intended to limit the present invention.

*Example I*

A solution of 3.4 g. of 2$\alpha$-methyl-$\Delta^4$-pregnen-21-ol-3,20-dione (2$\alpha$-methyl-desoxycorticosterone) in 20 cc. of a mixture chloroformpyridine 9:1 was cooled to 0° C. and mixed with 1.4 g. of methanesulfonyl chloride which was added in small portions. The reaction mixture was kept for 14 hours at 0° C. and then it was washed with dilute hydrochloric acid, water and sodium bicarbonate solution and the chloroform was evaporated under vacuum. The residue, consisting of the crude methanesulfonate of 2α-methyl-desoxycorticosterone was dissolved in 20 cc. of acetone and treated at room temperature and under stirring with 4 g. of sodium iodide. After decolorizing the mixture by the addition of sodium thiosulfate solution the product was precipitated by the addition of water and the crystalline 2α-methyl-21-iodo-Δ⁴-pregnene-3,20-dione was collected by filtration. The crude product was dried in vacuum, dissolved in 20 cc. of acetonitrile and treated dropwise with 1.4 g. of silver fluoride dissolved in 3 cc. of water. After a short time, silver iodide started to separate leaving the 2-fluoro-2α-methyl-Δ⁴-pregnene-3,20-dione in solution. The mixture was kept for 24 hours at room temperature and filtered. Concentration of the filtrate under vacuum gave a crude product which after crystallization from methanolacetone yielded the pure 21-fluoro-2α-methyl-Δ⁴-pregnene-3,20-dione or 2-fluoro-2α-methyl-progesterone.

*Example II*

By the same method described in Example I, there were prepared: 21-fluoro-2α-methyl-Δ⁴-pregnen-17α-ol-3,20-dione from 2α-methyl-Δ⁴-pregnene-17α,21-diol-3,20-dione (2α-methyl-"S"); 21-fluoro-2α-ethyl-Δ⁴-pregnen-17α-ol-3,20-dione from 2α-ethyl-Δ⁴-pregnene-17α,21-diol-3,20-dione (2α-ethyl-"S"); 21-fluoro-2α-benzyl-Δ⁴-pregnen-17α-ol-3,20-dione from 2α-benzyl-Δ⁴-pregnene-17α,21-diol-3,20-dione (2α-benzyl-"S"); 21-fluoro-2α-methyl-Δ⁴-pregnen-11β-ol-3,20-dione from 2α-methyl-Δ⁴-pregnene-11β,21-diol-3,20-dione (2α-methylcorticosterone); 21-fluoro-2α-ethyl-Δ⁴-pregnen-11β-ol-3,20-dione from 2α-ethyl-Δ⁴-pregnene-11β,21-diol-3,20-dione (2α-ethyl-corticosterone); 21-fluoro-2α-benzyl-Δ⁴-pregnen-11β-ol-3,20-dione from 2α-benzyl-Δ⁴-pregnene-11β,21-diol-3,20-dione (2α-benzyl-corticosterone); 2-fluoro-2α-methyl-Δ⁴-pregnene-3,11,20-trione from 2α-methyl-Δ⁴-pregnen-21-ol-3,11,20-trione (2α-methyl-11-dehydro-corticosterone); 21-fluoro-2α-ethyl-Δ⁴-pregnene-3,11,20-trione from 2α-ethyl-Δ⁴-pregnen-21-ol-3,11,20-trione (2α-ethyl-11-dehydro-corticosterone); 21-fluoro-2α-benzyl-Δ⁴-pregnene-3,11,20-trione from 2α-benzyl-Δ⁴-pregnen-21-ol-3,11,20-trione (2α-benzyl-11-dehydro-corticosterone); 21-fluoro-2α-methyl-Δ⁴-pregnene-11β,17α-diol-3,20-dione from 2α-methyl-Δ⁴-pregnene-11β,17α,21-triol-3,20-dione (2α-methyl-hydrocortisone); 21-fluoro-2α-ethyl-Δ⁴-pregnene-11β,17α-diol-3,20-dione from 2α-ethyl-Δ⁴-pregnene-11β,17α,21-triol-3,20-dione (2α-ethyl-hydrocortisone); 21-fluoro-2α-benzyl-Δ⁴-pregnene-11β,17α-diol-3,20-dione from 2α-benzyl-Δ⁴-pregnene-11β,17α,21-triol-3,20-dione (2α-benzyl-hydrocortisone); 21-fluoro-2α-methyl-Δ⁴-pregnen-17α-ol-3,11,20-trione from 2α-methyl-Δ⁴-pregnen-17α,21-diol-3,11,20-trione (2α-methyl-cortisone); 21-fluoro-2α-ethyl-Δ⁴-pregnen-17α-ol-3,11,20-trione from 2α-ethyl-Δ⁴-pregnen-17α,21-diol-3,11,20-trione (2α-ethyl-cortisone); and 21-fluoro-2α-benzyl-Δ⁴-pregnen-17α-ol-3,11,20-trione from 2α-benzyl-Δ⁴-pregnene-17α,21-diol-3,11,20-trione (2α-benzyl-cortisone).

We claim:
1. 21-fluoro-2α-methyl-Δ⁴-pregnen-17α-ol-3,20-dione.
2. 21-fluoro-2α-methyl-Δ⁴-3,11,20-trione.
3. A novel compound of the following formula:

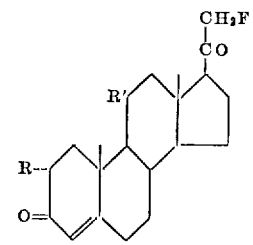

wherein R is selected from the group consisting of lower alkyl and aralkyl, and R' is keto.

References Cited in the file of this patent
UNITED STATES PATENTS

| 2,822,318 | Kroll et al. | Feb. 4, 1958 |
| 2,865,953 | Schneider et al. | Dec. 23, 1958 |
| 2,903,449 | Fried et al. | Sept. 8, 1959 |

OTHER REFERENCES

Hogg et al.: J.A.C.S. 77, Dec. 5, 1955, pages 6401–6402.
Tannhauser et al.: J.A.C.S. 1956, 78, page 2658.
Herz et al.: J.A.C.S. 1956, 78, page 4812.

UNITED STATES PATENT OFFICE
CERTIFICATE OF CORRECTION

Patent No. 3,088,950                                        May 7, 1963

Howard J. Ringold et al.

It is hereby certified that error appears in the above numbered patent requiring correction and that the said Letters Patent should read as corrected below.

Column 4, line 18, for "21-fluoro-2α-methyl-$\Delta^4$—3,11,20—trione" read -- 21-fluoro-2α-methyl-$\Delta^4$-pregnen-3,11,20-trione --.

Signed and sealed this 19th day of November 1963.

(SEAL)
Attest:

ERNEST W. SWIDER
Attesting Officer

EDWIN L. REYNOLDS
Acting Commissioner of Patents